United States Patent
Borthwick et al.

(10) Patent No.: US 10,599,614 B1
(45) Date of Patent: Mar. 24, 2020

(54) INTERSECTION-BASED DYNAMIC BLOCKING

(71) Applicant: Amazon Technologies, Inc., Seattle, WA (US)

(72) Inventors: Andrew Borthwick, Kirkland, WA (US); Tianyi Lu, Seattle, WA (US); Shehzad Qureshi, Seattle, WA (US); Timothy Jones, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 15/860,393

(22) Filed: Jan. 2, 2018

(51) Int. Cl.
*G06F 17/30* (2006.01)
*G06F 16/13* (2019.01)
*G06N 20/00* (2019.01)
*G06F 16/174* (2019.01)

(52) U.S. Cl.
CPC ........ *G06F 16/137* (2019.01); *G06F 16/1748* (2019.01); *G06N 20/00* (2019.01)

(58) Field of Classification Search
USPC .................................................. 707/692, 693
See application file for complete search history.

(56) References Cited

U.S. PATENT DOCUMENTS

| | | | |
|---|---|---|---|
| 7,152,060 B2 | 12/2006 | Borthwick et al. | |
| 7,185,088 B1 | 2/2007 | Joy et al. | |
| 7,366,718 B1 | 4/2008 | Pugh et al. | |
| 7,711,679 B2 | 5/2010 | Patterson | |
| 7,899,796 B1 | 3/2011 | Borthwick et al. | |
| 8,645,399 B2 | 2/2014 | McNeill et al. | |
| 2005/0131939 A1 | 6/2005 | Douglis et al. | |
| 2008/0072182 A1* | 3/2008 | He | G06F 17/504 716/113 |
| 2008/0235163 A1 | 9/2008 | Balasubramanian et al. | |
| 2008/0294696 A1 | 11/2008 | Frandzel | |
| 2011/0088020 A1* | 4/2011 | Eichenberger | G06F 8/456 717/149 |
| 2019/0068916 A1* | 2/2019 | Arora | H04N 7/0117 |

OTHER PUBLICATIONS

Anonymous Author, "Intersection-Based Dynamic Blocking", Submitted to KDD 2018. (Do not distribute), pp. 1.

* cited by examiner

*Primary Examiner* — Hung T Vy
(74) *Attorney, Agent, or Firm* — Robert C. Kowert; Kowert, Hood, Munyon, Rankin & Goetzel, P.C.

(57) ABSTRACT

Block size reduction iterations are performed on a plurality of blocks of records until a block size criterion is met. An iteration comprises identifying, from a first collection of blocks, using one or more pivot operations, a set of combinations of oversized blocks such that at least one record belongs to all blocks of a combination. A new block comprising records that are members of each block of a first combination of the set is included in a second collection of blocks to be examined in a subsequent iteration. On at least one block created in an iteration, analysis operations are performed.

20 Claims, 12 Drawing Sheets

| RecordID | N-way block combinations/intersections (N =2) | BlockIDs for new combinations |
|---|---|---|
| 1 | 101&102,101&103,101&104,102&103, 102&104,103&104 | 201,202,203,204,205,206 |
| 2 | 101&102,101&103,102&103 | 201,202,204 |
| 3 | 101&103,101&104,103&104 | 202,203,206 |
| ... | ... | ... |

← 801

804 →

| BlockID | Block meaning | RecordIDs | BlockSize | Oversized? (Size > 30?) |
|---|---|---|---|---|
| 201 | FirstName=fn1 &LastName=ln1 | 1,2,... | 40 | Y |
| 202 | FirstName=fn1 &Gender=M | 1,2,3,... | 50 | Y |
| 203 | FirstName=fn1 &Age=22 | 1,3,... | 20 | N |
| 204 | LastName=ln1 &Gender=M | 1,2,... | 25 | N |
| 205 | LastName = ln1 &Age=22 | 1,... | 15 | N |
| 206 | Gender=M &Age=22 | 1,3,... | 60 | Y |
| ... | ... | ... | ... | ... |

| RecordID | BlockIDs |
|---|---|
| 1 | 201,202,206 |
| 2 | 201,202 |
| 3 | 202,206 |
| ... | ... |

INTERSECTION-BASED DYNAMIC BLOCKING

BACKGROUND

For some databases, raw input is collected from a variety of heterogeneous data sources, such that a single real-world entity (such as a person or a product) may be represented by multiple input records. In such scenarios, the detection and elimination of redundant information may be required for various applications. The same information can legitimately be represented in several different ways: for example, one record referring to a given individual may use a shortened version of a name ("Dan" or "Danny"), while another uses the full version ("Daniel"); addresses may be represented differently (e.g., "South First Street" versus "S. $1^{st}$ St.") in the two records, and so on. Even with today's fast computing cores and large memories, comparing all possible pairs of records in a large data set to identify duplicates may be intractable. Identifying sub-groups or blocks of similar records of large data sets on which similarity-based redundancy elimination can be performed in reasonable timeframes remains a non-trivial technical challenge.

BRIEF DESCRIPTION OF DRAWINGS

FIG. 7, FIG. 8, and FIG. 9 collectively illustrate a simple example of operations that may be performed during various stages of intersection-based dynamic blocking, according to at least some embodiments.

Figure 1:
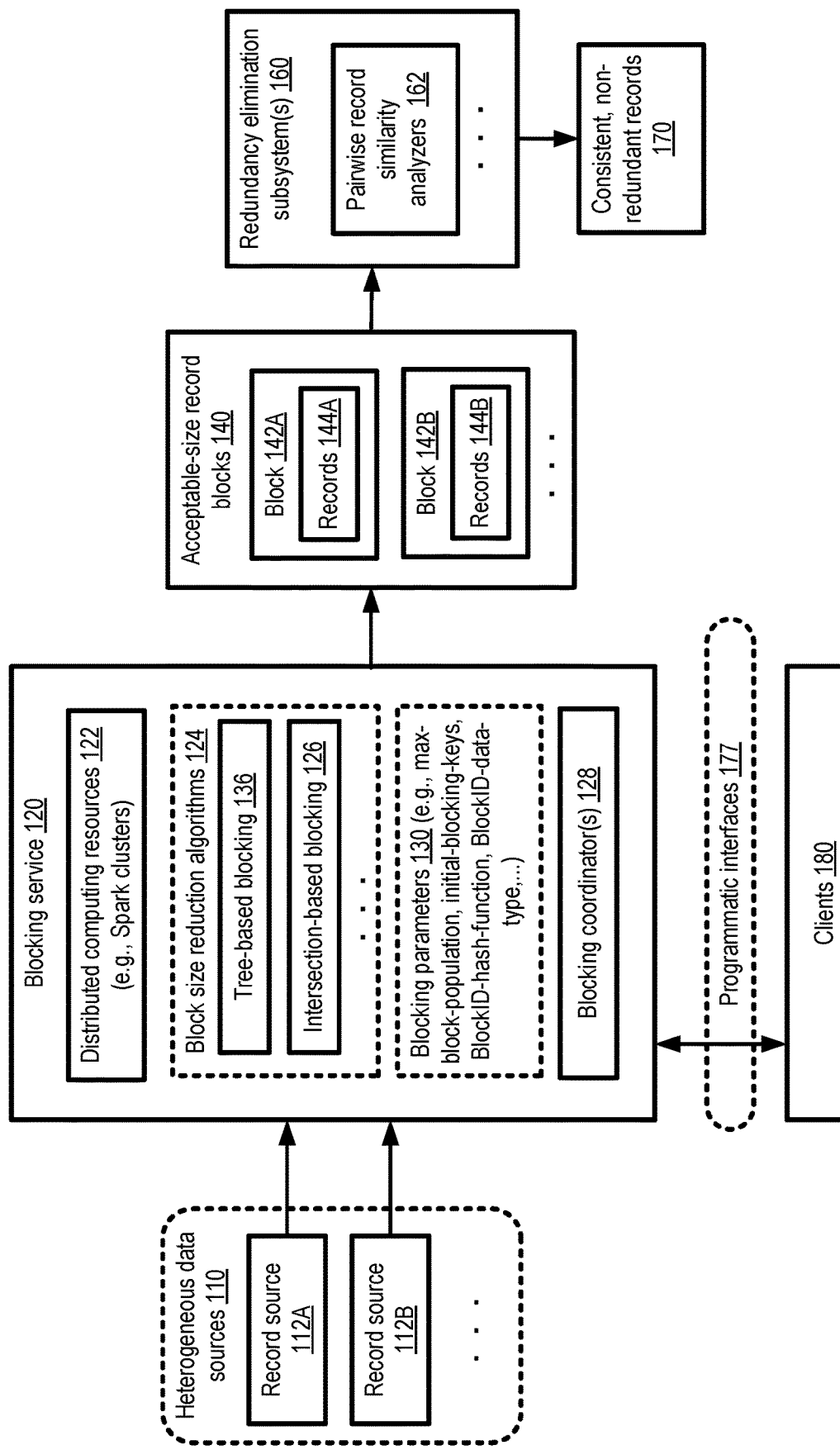
FIG. 1 illustrates an example system environment in which intersection-based dynamic blocking may be performed, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for intersection-based dynamic blocking, in which the sizes (in terms of the number of member records) of blocks, where each block comprises a plurality of similar-seeming records, are iteratively reduced by identifying non-empty intersections of combinations (e.g., pairs) of oversized input blocks analyzed in a given iteration are described. The overall goal of the intersection-based dynamic block size reduction iterations may comprise, in various embodiments, automatically generating blocks whose record populations are small enough to enable detailed similarity analysis (e.g., on pairs of records at a time, or more generally on groups comprising n records at a time) to be performed for all possible pairs of records in an individual block. In at least some embodiments, one or more pivot operations (which may also be referred to as inverted indexing operations or data inversion operations) may be employed to efficiently identify all non-empty intersection combinations of a desired combination size (e.g., a combination size of two if pairs of blocks are to be identified, a combination size of three in the case of block triples, and so on). The technique may be considered dynamic in some embodiments in that the definitions of the blocks (e.g., the attributes and values which distinguish blocks from one another) may be data dependent, and may only be determined at run-time, instead of, for example, being statically pre-determined. The block size reduction iterations may be continued in some embodiments until a block size criterion is satisfied or met—e.g., until the population of all the remaining blocks is less than or equal to a desired threshold. Blocks whose record populations are no greater than the threshold may be referred to as acceptable blocks in various embodiments, while blocks whose record populations are greater than the threshold may be referred to as oversized blocks. On the acceptable blocks identified or created in the block size reduction iterations, additional redundancy analysis operations (such as pairwise linkage of records using machine learning-based algorithms for similarity analysis) of a redundancy elimination workflow may be performed in some embodiments.

At a high level, in the pivot operations corresponding to a given block size reduction iteration, mappings between block identifiers and the record identifiers of the records which belong to the blocks may be inverted in some embodiments, obtaining mappings between individual record identifiers and the blocks to which the individual records belong. Then, corresponding to a given record identifier, combinations of a desired block count (e.g., a count of two in the case of pairs of blocks) among the blocks may be identified, and new blocks (with corresponding unique block identifiers) may be generated corresponding to each such combination in various embodiments. The new blocks may be included in the set of blocks to be analyzed in the next iteration in such embodiments. A detailed example illustrating the concepts involved in some embodiments in intersection-based dynamic blocking using pivot operations is provided below in the discussion regarding FIG. 7, FIG. 8 and FIG. 9.

Individual records being analyzed may be assigned a respective unique fixed-size record identifier (e.g., a 256-bit or 128-bit numeric or string value) in various embodiments. Block identifiers, which may also be of a fixed size, may also be referred to as blocking keys in some embodiments. Using logical columns indicating block membership of a given record, a list or group of block identifiers of the blocks to which a given record of an oversized block belongs may be identified in some embodiments, e.g., using the equivalent of group-by or other similar aggregation operations. Then, from the elements of the list of block identifiers for a given record, as mentioned above, combinations of block identifiers of a desired combination length (e.g., a combination length of two, if intersections of pairs of blocks such as (B1, B2) are be used as input blocks for the next iteration, or a combination length of three, if intersections of triplets of blocks such as (B1, B2, B3) are to be used as input blocks for the next iteration) may be identified in one embodiment. Duplicated/replicated combinations (where, for example, the combination (B1, B2, B3, B4) may be considered a duplicate of the combination (B1, B3, B2, B4), and the combination (B2, B3) may be considered duplicated or subsumed within the combination (B1, B2, B3, B4)), if any are detected, may be eliminated in various embodiments. New block identifiers corresponding to the remaining non-duplicate combinations may be generated, and the records which belong to the corresponding new blocks may be identified in some embodiments, e.g., using another pivot operation, for use as input in the next block size reduction iteration. In at least some embodiments, an exhaustive set of non-empty intersections of one or more combination lengths of the input oversized blocks may be identified efficiently in a given block size reduction iteration using such a pivot-based technique.

In some embodiments, as mentioned above, block identifiers of a fixed size (e.g., 64 bits or 256 bits) may be generated, regardless of the iteration count. For example, when generating a new block from the intersection of blocks with identifiers B1 and B2, where each block identifier is of a particular size s1, in one embodiment the parent block identifiers B1 and B2 may be provided as input to a hash function, and a hash value which is also of size s1 may be obtained as output from the hash function and used as the block identifier of the intersection block. Other transformation functions may be employed in other embodiments. At least the majority of the computations involved in a given block size reduction iteration may be performed using the record identifiers and the block identifiers alone in some embodiments; values of various attributes of the records, or semantic details regarding the meaning or distinguishing features of the blocks may not have to be stored or analyzed. Using fixed-size block identifiers in this way may reduce the memory requirements for block-size reduction operations in some embodiments, e.g., relative to the memory that may have been required if the attribute-value combinations that correspond to the block definitions were retained across iterations, which may lead to longer and longer block identifiers as more iterations are performed. In some embodiments, the sizes of some block identifiers may differ from the sizes of other block identifiers.

According to one embodiment, at least an initial set of block identifiers may be generated based at least partly on values of specific attributes or fields of the records. For example, if an input record contains an attribute "first name" storing the first name of an individual, whose value for this first name is "John", a block identifier based on the attribute-value combination "first name=John" may be generated in various embodiments corresponding to this example record. In at least some embodiments, the same transformation function (e.g., hash function) may be used to generate the block identifiers for the initial set of blocks as is used to generate block identifiers for subsequent iterations of block size reduction, resulting in uniformly-sized block identifiers regardless of the iteration count.

In some embodiments, duplicates may be eliminated at one or more stages of a block size reduction iteration. As mentioned above, when new combinations of blocks whose intersections are to be used as input blocks for a subsequent iteration are being identified, duplicate combinations (either complete duplicates such as B1&B2&B3 versus B3&B2&B1, or duplicates involving containment such as B1&B2 versus B1&B2&B3) may be eliminated by removing one of the duplicated combinations. In addition, two or more individual blocks which are generated during a given iteration may sometimes comprise the same set of records. For example, in one embodiment, during a given iteration, block B75 comprising records (R1, R2, R3, R4 and R5) may be generated as a result of an intersection computed between blocks B56 and B64, while block B82, also comprising records (R1, R2, R3, R4 and R5) may be generated as a result of an intersection computed between blocks B34 and B67. In some embodiments, such duplicate blocks may be identified and removed from the collection of blocks to be examined in a subsequent iteration. The early elimination of duplicate block combinations and duplicate blocks may help make the described intersection-based dynamic blocking techniques more efficient than some other blocking techniques, in which for example sub-trees containing duplicated attribute-value node combinations may sometimes be generated and processed.

The intersection-based dynamic blocking techniques discussed herein may be suitable for various types of parallel or distributed processing approaches in some embodiments. In one embodiment, for example, a clustered computing framework (similar, for example, to Apache Spark) may be employed for the computations of the block size reduction iterations. A collection of blocks to be analyzed in a given iteration may be divided into a plurality of partitions in such an embodiment. A plurality of nodes of a distributed computing environment to be used for a subsequent iteration may be identified, and respective partitions may be transmitted to respective nodes for processing. In one embodiment, the data may be transmitted from the main memory of one or more source nodes of the environment to the main memory of one or more destination nodes, without saving the transmitted data to persistent storage, thereby potentially avoiding at least some costs associated with disk I/O. Results obtained in a given block size reduction iteration at the individual nodes may be checkpointed or saved at a persistent repository in some embodiments.

In at least one embodiment, block size reduction iterations of the kind described may be implemented at a blocking subsystem of a network-accessible redundancy elimination service of a provider network or public cloud environment. Such a service may implement a set of programmatic interfaces (e.g., web-based consoles, application programming interfaces, command-line tools, and/or graphical user interfaces) which can be used by service clients to issue requests to, and receive responses from, the service in some embodiments. In one embodiment, such programmatic interfaces may be used by a client to request that one or more phases of a redundancy reduction workflow be performed on a specified set of data records from one or more data sources, to provide guidelines or preferences regarding various phases of the analysis, and/or to view summarized or detailed intermediate or final results of various redundancy reduction-related tasks, including intersection-based dynamic blocking. In some embodiments, a client may indicate a set of record attributes and/or values to be used to identify top-level or initial blocks via such interfaces.

Example System Environment

FIG. 1 illustrates an example system environment in which intersection-based dynamic blocking may be performed, according to at least some embodiments. As shown, system 100 may comprise a network-accessible blocking service 120 responsible for generating records blocks 140 of acceptable sizes from a plurality of records obtained from a set of heterogeneous data sources 110 (e.g., record sources 112A and 112B). It is noted that while the blocking algorithms described herein may be applied in some embodiments to records obtained from multiple data sources as shown in FIG. 1, in other embodiments blocking may be performed on records obtained from a single data source (which may include some level of duplicated information). Each block generated by the service may comprise records that are similar to one another with respect to some set of dimensions or attributes in the depicted embodiment (although details regarding exactly which attributes are similar within a given block may not be retained across block size reduction iterations as discussed below). The specific attributes and/or attribute values used for distinguishing among the blocks initially may be dynamically selected in some embodiments. Blocks whose record population is no greater than a maximum-block-population parameter setting may be designated as acceptable-size blocks in various embodiments; blocks larger than that threshold size may be deemed oversized blocks. The acceptable-size blocks 140, such as block 142A (comprising records 144A) and block 142B (comprising records 144B) may be passed on to one or more redundancy elimination subsystems 160 in the depicted embodiment, where for example pairwise similarity analysis (or similarity analysis on more than two records at a time) may be performed on the records of a given acceptable-size block by a set of analyzers 162. In at least one embodiment, the output of the blocking service may comprise, for a given acceptable-size block, just the record identifiers of the member records of the block; the actual content of the records may be stored elsewhere and may be accessed, using the record identifiers, for further analysis. In one embodiment, if the input records are assumed to comprise values for some number of attributes, the output of the blocking service may in effect include the value of an additional attribute representing the block identifier of an acceptable-size block in individual ones of the records. The output of the redundancy elimination subsystems 160 may comprise a set of consistent, non-redundant records 170 with respect to various entities, with each record potentially combining information that was originally present in multiple records obtained from record sources 112. An overview of a multi-stage workflow which may be used in some embodiments for redundancy analysis, which includes steps other than blocking and pairwise matching, is provided below in the context of FIG. 2. It is noted that in one embodiment, the output 140 generated by the blocking service may be used for other types of analysis operations, which do not necessarily involve the detection or elimination of redundancy—e.g., for consolidating/combining information from multiple sources, for comparing information obtained from multiple sources, and so on.

A number of different applications, with respective sets of heterogeneous data sources 110, may rely on the elimination of redundant information using a blocking service 120 of the kind illustrated in FIG. 1 in various embodiments. For example, in one embodiment, an application enabling "people search" may be developed, for which the input data records may be obtained from sources such as government agencies (which may provide access to marriage, death and divorce records), publicly available professional or social network profiles, commercial databases (such as financial and property reports), and so on. People-related records obtained from these different sources may, for example, comprise different combinations of fields such as name, address, birthday, phone number, job title, university/school attended, etc. in some embodiments. The ultimate objective of the people search application may be to generate a consistent and comprehensive record representing each individual referenced in the data sources, such that search queries for people, expressed in terms of various fully or partially-specified attribute values, can be fulfilled quickly and correctly. In an application designed for an e-retailer, in one embodiment it may be important to be able to disambiguate between similar-seeming inventory items, and the input data records may be obtained from the item producers, resellers, other e-retail web sites (e.g., competitor e-retailers) and the like. For some music or video-related applications, redundancy elimination may be used to disambiguate among video clips, songs/films which may be described differently in respective source databases, and so on in various embodiments.

In order to achieve these types of objectives, detailed pairwise similarity analysis may eventually have to be performed among records in various embodiments—e.g., from a given group of records, all possible pairs may have to be identified, and the extent to which member records of a given pair resemble each other may have to be estimated. However, in scenarios where billions of records pertaining to a particular type of entity may potentially be available from the collection of data sources 112, enumerating and analyzing all possible pairs may not be feasible given the resources available for the analysis in at least some embodiments. Accordingly, the set of available data records may be subdivided into blocks or groups of similar-seeming records, and then detailed pairwise analysis may be performed among the records of a given block in various embodiments. However, with large input data sets, an initial subdivision of the available data records into a set of top-level blocks may not be sufficient, as some or all of the first set of blocks identified may also be too large for pairwise analysis, so further reductions in block sizes may be required in some embodiments. For example, a set of records representing individuals may initially subdivided into top-level blocks based on first names ("last name=Smith", "last name=Jones", etc.) and/or ages ("age=30 years", "age=40 years" etc.). Some last names may be much more frequent than others, so the top-level blocks corresponding to the more common last names may still be too large for pairwise analysis. Similarly, the populations of individuals of some ages in the group of records being considered may be larger than those for other ages, and some age-based blocks may also be too large. Block sizes may be reduced iteratively by generating new blocks that correspond to intersections of the original blocks in some embodiments, e.g., using an intersection-based blocking algorithm 126 at the blocking service 120 in some embodiments as described below in further detail. In the depicted embodiment, the workflow of implementing block reduction with respect to a given input data set may be orchestrated by one or more blocking coordinators 128, implemented using one or more computing devices. Blocking coordinators 128 may be able to utilize any of several block size reduction algorithms 124 in some embodiments, including the intersection-based blocking algorithm 126, a tree-based blocking algorithm 136, and/or additional algorithms.

At least some of the block size reduction algorithms 124, including for example the intersection-based blocking algorithm 126, may be suitable for distributed or parallel processing in various embodiments. In one embodiment, distributed computing resources 122 (such as Spark clusters or other types of distributed computing platforms) may be employed to speed up block size reduction, e.g., by partitioning the input data set for a given iteration, performing at least a subset of the computations on different partitions at respective cluster nodes in parallel, and then re-distributing or shuffling the outputs of the local computations for subsequent iterations as needed. Some aspects of the intersection-based blocking algorithm, such as the use of relatively small fixed size block identifiers and record identifiers, and the fact that the attribute names/values used to distinguish among blocks do not have to be retained across iterations, may enable block size reduction to be performed primarily using main memories of cluster nodes even for fairly large input data sets in some embodiments. Such main-memory based block size reduction may result in orders-of-magnitude speed improvements relative to some other algorithms (such as some forms of tree-based blocking 136) in one embodiment.

In at least some embodiments, a method implementing the intersection-based blocking algorithm 126 may comprise performing one or more block size reduction iterations. A given iteration may comprise identifying, from a first collection of blocks (which may be considered the input to the iteration), using computations which include one or more pivot operations, a set of combinations of oversized blocks such that at least one record belongs to all blocks of a combination in some embodiments. Note that the input blocks that are already of an acceptable size (if any) may be set aside, saved, or forwarded for further stages of redundancy analysis in various embodiments, and only the remaining oversized blocks (if any) may be analyzed further. In some embodiments, the method may further comprise including, in a second collection of blocks to be examined as input in a subsequent block size reduction iteration, a new block comprising one or more records that are members of each block of a first combination of the set. In effect, new blocks may be created from respective non-empty intersections of combinations (e.g., pairs, triplets, 4-tuples, etc.) of input oversized blocks in a given iteration in such an embodiment, and then those new blocks may be analyzed in the next iteration. Because an intersection of two sets is, by definition, no larger than either of the two sets being intersected, the iterations may lead to smaller and smaller blocks being generated in various embodiments in which intersection-based blocking is employed.

In one example implementation, all possible two-way combinations or pairs of oversized blocks may be considered in at least one iteration. If the input collection of oversized blocks is (B1, B2, B3), the pairs (B1, B2), (B1, B3), and (B2, B3) may be identified using pivot operations in such an implementation. Details and examples of the pivot operations and other computations such as group-by operations that may be employed to identify the non-empty intersections of the blocks in some embodiments are provided below. In one embodiment, in one of the pivot operations, starting with a given group of block-to-record mappings for oversized blocks, a corresponding group of record-to-block-list mappings may be generated, and then unique combinations of the members of the block-lists may be identified to create new blocks to be analyzed in the next iteration. The pairs or combinations that do not comprise at least one record may not be considered for further analysis in at least some embodiments. For example, if there are no records that belong to both B1 and B3 in the above example, at least one record belongs to both B1 and B2, and at least one record belongs to both B2 and B3, only the intersections of the block pairs (B1, B2) and (B2, B3) may be used to generate respective new blocks B4 (corresponding to the intersection of B1 and B2) and B5 (corresponding to the intersection of B2 and B3) for the next iteration. In at least one embodiment, as new blocks are created in the block size reduction iterations, it may sometimes be the case that a given record does not belong to any of the newly-created intersection-derived blocks, such that the smallest generated block to which the record belongs is still oversized; in such a scenario, such records may also have to be eliminated from further consideration. In various embodiments, duplicate combinations may be eliminated in a given block size reduction iteration. In at least some embodiments, duplicate blocks (blocks which contain the same set of records), if any such blocks happen to be created in a given block size reduction iteration, may also be identified and eliminated from further consideration.

In at least some embodiments, a transformation function such as a selected hash function may be used to generate unique identifiers for each block that is created during the block size reduction iterations (and/or for each initial block that is created prior to the start of the iterations). For example, during a given iteration in which a new block B3 is created by computing the intersection of input oversized blocks B1 and B2, the block identifiers of B1 and B2 may be provided as input to such a transformation function, and the output of the hash function (e.g., a 64-bit value, or a 128-bit value) may be used as the block identifier of B3. Similarly, in at least one embodiment, the initial set of blocks (which may be referred to as top-level blocks) created prior to block size reduction iterations may be selected based on attribute-value combinations (e.g., "last name=Jones"), and a transformation function that consumes the attribute names and values as input, and produces a fixed-length output, may be used to generate the initial block identifiers. In some embodiments, the same transformation function may be used in each iteration, resulting in block identifiers of the same length. In other embodiments, different transformation functions may be used, and/or block identifier lengths/sizes may differ.

Values for a number of settings or parameters 130 may be selected in various embodiments, e.g., by the blocking coordinators 177 being used for a given application, and/or based on input provided by clients 180 of the service 120. Such parameters 130 may in one embodiment include a maximum-block-population parameter (which determines whether a block is classified as acceptable-size or oversized) and/or a set of initial blocking keys (attribute-value combinations, such as "name=Smith", "age >70" etc., to be used to generate the initial set of blocks from a plurality of records). Parameters 130 may also include, for example, a hash function to be used to generate block identifiers, a data type (e.g., long integer, integer, string or the like, which may also influence the length of the block identifiers) to be used for the block identifiers, and so on in the depicted embodiment.

In at least one embodiment, at least some of the computations involved in a given block size reduction iteration may be spread across multiple execution platforms or nodes (e.g., nodes implemented using distributed computing resources 122). For example, the input block collection for an iteration may be partitioned, with respective partitions transmitted to respective nodes of a cluster for execution in some embodiments. The results obtained at the different nodes may be combined (e.g., by saving or check-pointing the results to disk I/O) at various stages of the algorithm in some embodiments.

The blocking service 120 may implement one or more programmatic interfaces 177, such as a web-based console, a set of APIs, command-line tools, graphical user interfaces and the like which may be used by clients 180 to interact with the service 120 in the depicted embodiment. Using such interfaces 177, a client 180 may, for example, submit a blocking request for an application, indicate a set of record sources from which records for an application are to be retrieved for blocking, one or more of the parameters 130, and so on. In one embodiment, a client may indicate, via such an interface 177, a set of record attributes and/or corresponding values which are to be used to generate an initial or top-level set of blocks for an application. In at least one embodiment, a client may indicate attributes names and/or values which are to be used for blocking during other stages than the generation of the top-level blocks—e.g., a client may indicate one set of attribute names/values to be used for top-level blocks, another set of attribute names/values to be used for creating sub-blocks from the top-level blocks, and so on. In some embodiments, intermediate and/or final results and metrics of the blocking iterations (such as the number of acceptable-size blocks 140 that are generated, the total number of iterations or time taken, the resources consumed etc.) may be provided to clients 180 via the programmatic interfaces 177.

As mentioned above, in at least some embodiments, one or more tree-based blocking algorithms 136 may be part of the suite of block size reduction algorithms usable at the blocking service 120. According to one such tree-based blocking algorithm, in one embodiment a set of top-level blocking properties (e.g., attribute-value combinations) and a set of sub-blocking properties may be identified as blocking keys. An ordering (e.g., a lexicographic ordering based on string versions of attribute-values combinations of the blocking and sub-blocking properties) selected for the keys may be used to construct a binomial tree in some embodiments, where each node of the tree contains a list of block keys and is the parent of nodes that have keys that come later in the ordering. In such embodiments, each node may be associated with a block whose key is the list of block keys in that node, and whose records are the intersection of the records in those blocks. In one embodiment, the tree may be traversed breadth-first, with recursion being performed at oversized nodes. The space of possible sub-blocks may thus be explored in cardinality order for a given branch of the tree in some embodiments in which such a tree-based algorithm is employed, with the exploration stopping as soon as an acceptable-size sub-block is found. Such an algorithm may in at least some embodiments be less efficient than the intersection-based algorithm described above for any of several reasons—e.g., trees do not have to be constructed in the intersection-based algorithm, the meanings (attribute-value combinations) of the sub-blocks do not have to be retained, main-memory-based distributed implementations may not be possible for the tree-based algorithm because of the larger amount of data that has to be retained, and it can be shown that the total number of iterations required for convergence may be greater for the tree-based algorithm than for the intersection-based algorithm. In at least one embodiment, a client 180 may indicate a preferred algorithm to be used for a given application which requires block size reduction; for example, the client may request that the intersection-based algorithm should be used, or that a tree-based algorithm should be used. In other embodiments, the algorithm may be selected by the blocking coordinators 128.

Redundancy Elimination Workflow

Figure 2:
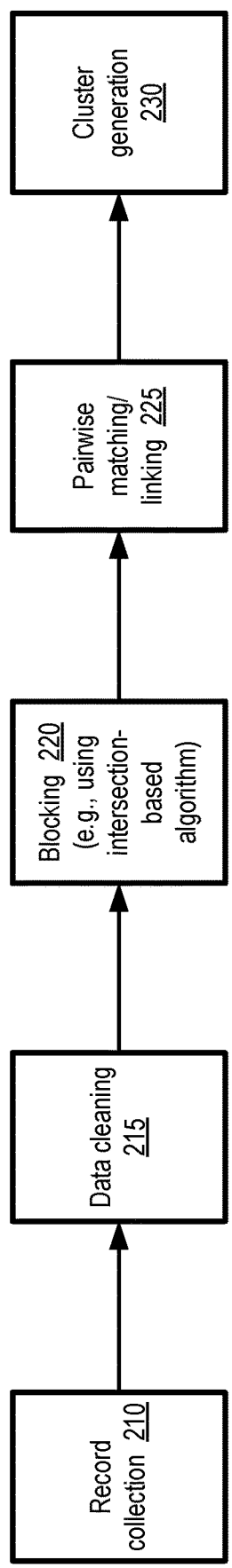
FIG. 2 illustrates an overview of a workflow for redundancy elimination among data records, according to at least some embodiments.

The task of identifying acceptable-size blocks may form a part of a larger pipeline or workflow of redundancy elimination operations in some embodiments. FIG. 2 illustrates an overview of a workflow for redundancy elimination among data records, according to at least some embodiments.

As shown, tasks which collectively make up the workflow may be performed in at least five stages in the depicted embodiment, including for example record collection 210, data cleaning 215, blocking 220, pairwise matching/linking 225, and cluster generation 230. Each of these stages may be implemented using one or more computing devices in at least some embodiments. In the record collection stage 210, in some embodiments network connectivity may be established to one or more record sources for an application which requires data redundancy elimination. The information needed to establish connectivity and extract the raw records (e.g., a network address, authorization credentials if any, etc.) may be provided programmatically by a client of the redundancy elimination service or system in various embodiments. Note that at least in some embodiments, new data records may be generated at the data sources frequently, so the record collection operations may have to be performed frequently (e.g., in a batch mode or continuously). In at least one embodiment, input data records may be streamed to the redundancy elimination system—e.g., new records may arrive at various points in time over a set of one or more open network connections. In some embodiments in which new data records may become available over time, the record collectors may be responsible for batching the records for further analysis—e.g., the records received during the course of a day or an hour may be batched and transmitted to the data cleansing stage.

In the data cleaning stage 215, bogus, junk and/or spam records may be identified and removed in some embodiments. In at least one embodiment, records may be normalized to an approximately common representation or format, with empty fields/attributes, duplicate fields, outlier values, and encoding issues being addressed. In the blocking stage 220, initial blocks of similar-seeming records may be constructed, and a block size reduction algorithm (such as the intersection-based dynamic blocking algorithm introduced above) may be used to create blocks that meet a maximum size criterion in various embodiments.

In the pairwise matching/linking stage 225, in some embodiments, all pairs of records within a given block may be matched or analyzed for similarity, e.g., using a high-precision machine learning model, and respective similarity scores may be assigned to each pair. If a given pair's similarity score exceeds a threshold, the records of the pair may be assumed to represent the same entity in such embodiments. In the clustering stage 230, in some embodiments record pairs may be combined into connected components, and then further partitioned to remove inconsistent pair-wise links. In effect, in some embodiments, in response to determining that a similarity score of a pair of records exceeds a threshold, an aggregated record based at least in part on the records of the pair may eventually be generated. At the end of the workflow, in various embodiments, profiles combining information from the heterogeneous data sources may have been created for the entities represented in the input data. It is noted that in some embodiments, intersection-based blocking of the kind described herein may be used in workflows that differ from that shown in FIG. 2.

Blocking Concepts

Figure 3:
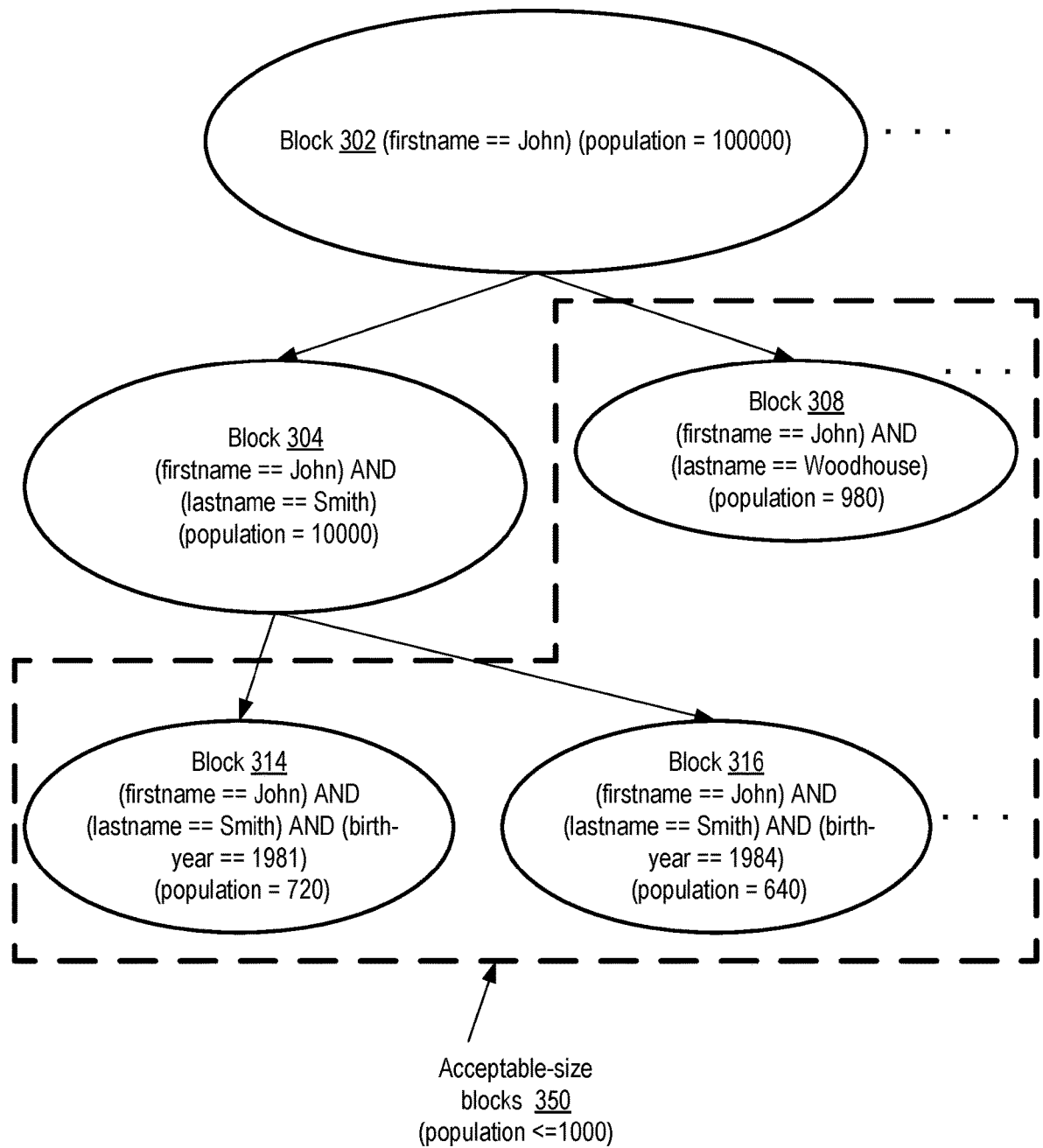
FIG. 3 illustrates concepts underlying dynamic blocking, according to at least some embodiments.

FIG. 3 illustrates concepts underlying dynamic blocking, according to at least some embodiments. In the depicted example, a database comprising records about individuals is eventually to be analyzed using pairwise linking as discussed above, and a target maximum population of a record block is 1000. The input data records may initially be divided into top-level blocks using the first name of the represented individuals in the depicted embodiment, and a particular block 302 of records, in each of which the individual's first name is "John", may comprise 100000 records. Other initial blocks, such as blocks based on last name and/or birth-year, may also have been constructed in the depicted embodiment but are not shown in FIG. 3 to avoid clutter.

Accordingly, in a first round of block size reduction, two sub-blocks (e.g., intersection-based blocks) may be constructed from block 302 in the depicted embodiment: block 304, comprising records of individuals with the first name "John" and last name "Smith", and block 308, comprising records of individuals with the first name "John" and last name "Woodhouse". The population (980) of block 308 is lower than the target threshold of 1000, so block 308 may be designated as acceptable-size block 350 and set aside for further redundancy-related processing in the depicted embodiment. However, block 304 has a population of 10000, so it may have to be further subdivided.

From block 304, a set of smaller sub-blocks including 314 and 316 may be generated in the depicted embodiment. In block 314, records of individuals whose first name is "John", last name is "Smith" and birth-year is 1981 may be included. In block 316, records of individuals whose first name is "John", last name is "Smith" and birth-year is 1984 may be included, and so on. The populations of blocks 314 and 316, which are shown as 720 and 640 (both less than the target maximum population of 1000), may result in these blocks being classified as acceptable-size as well in the depicted example scenario. Eventually, after more block size reductions are performed if needed, all (or at least the vast majority of) the records being analyzed may be grouped into blocks of acceptable sizes in the depicted embodiment, and the acceptable blocks may then be analyzed further for redundancy, e.g., using pairwise matching/linking algorithms as discussed above.

Overview of Intersection-Based Dynamic Blocking

Figure 4:
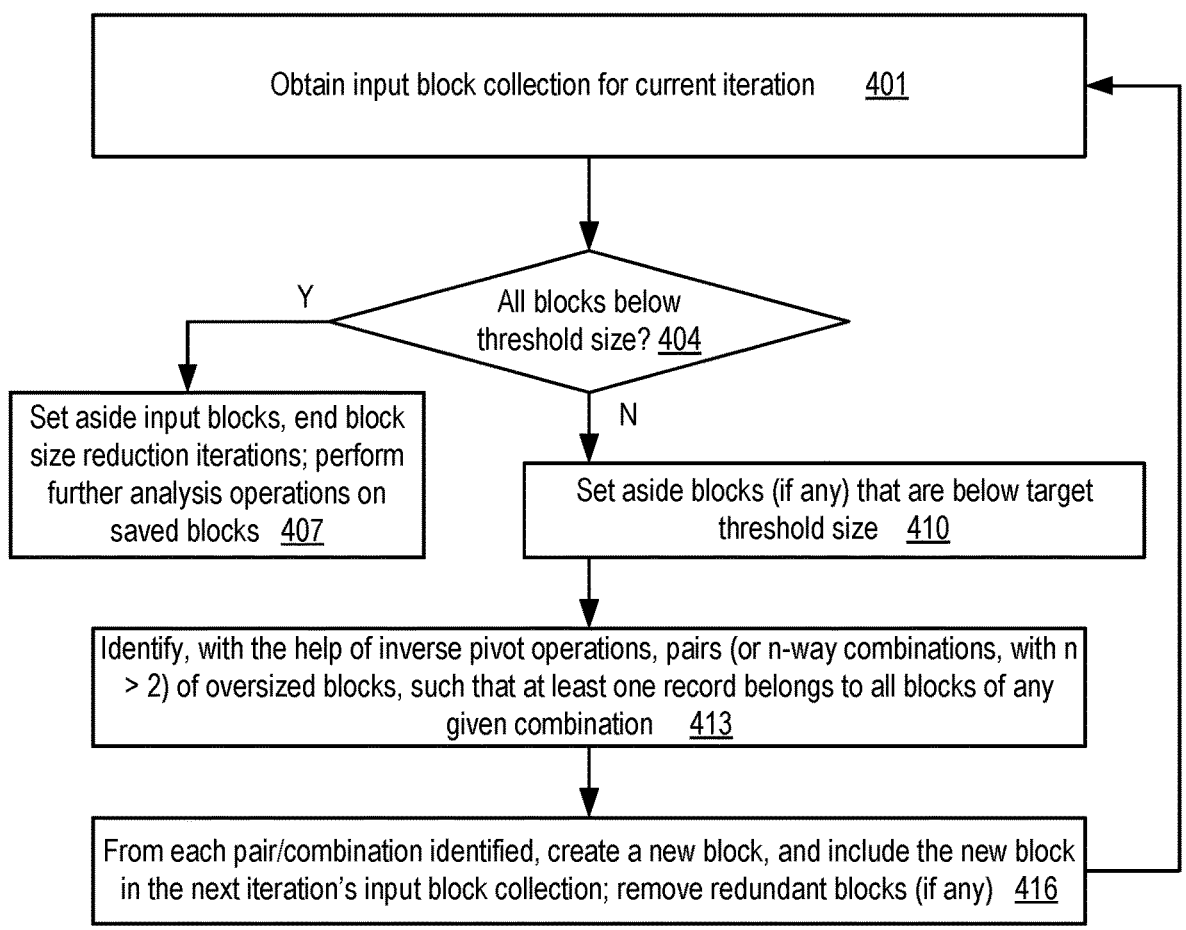
FIG. 4 is a flow diagram illustrating a high-level overview of operations which may be performed to implement intersection-based dynamic blocking, according to at least some embodiments.

FIG. 4 is a flow diagram illustrating a high-level overview of operations which may be performed to implement intersection-based dynamic blocking, according to at least some embodiments. Additional details of intersection-based blocking are provided below, e.g., in the context of FIG. 6. An input collection of blocks comprising records pertaining to an application may be obtained for a current iteration of block size reduction operations in the depicted embodiment (element 401). If a block size criterion has already been met, e.g., if the sizes of all the input blocks is below a target threshold, as determined in operations corresponding to element 404, the input blocks may be saved or set aside (element 407) and the block size reduction iterations may be terminated in various embodiments. Further stages of analysis (e.g., pairwise linking, clustering and the like) may be performed on the blocks saved during various block size reduction iterations in at least some embodiments.

If at least some of the input blocks do not meet the target threshold size criterion (as also detected in operations corresponding to element 404), additional processing may be performed for the current block size reduction iteration. If any of the input blocks do meet the target threshold criterion, they may be set aside, e.g., for further redundancy analysis (element 402) in various embodiments. At this point, only oversized blocks among the input collection of blocks may remain to be processed in the current iteration in the depicted embodiment.

As shown in element 413, pairs (or other n-way combinations) of the oversized blocks, such that at least one record belongs to all blocks of any given combination, may be identified in the depicted embodiment, e.g., with the help of inverse pivot operations as discussed below in further detail. The operations shown in element 413 may represent the computation of an exhaustive set of non-empty n-way intersections (where n=2 in the case where pairs are being identified) of the sets represented by the oversized blocks in various embodiments. In some embodiments, intersections of more than one combination length or block count (e.g., pairs, triples, 4-tuples etc.) may be determined.

From each pair or n-way combination identified, a new block may be created, comprising records that belong to all the input blocks of the combination, and that new block may be included in the input block collection to be examined in the next iteration (element 418) in at least some embodiments. If a redundant block is identified (e.g., if a given block generated from the combinations comprises exactly the same records as another) at this stage, it may be removed from the collection to be analyzed in the next iteration in various embodiments. The operations of elements 401 onwards may then be repeated to implement the next block size reduction iteration in the depicted embodiment.

Block Identifiers

Figure 5:
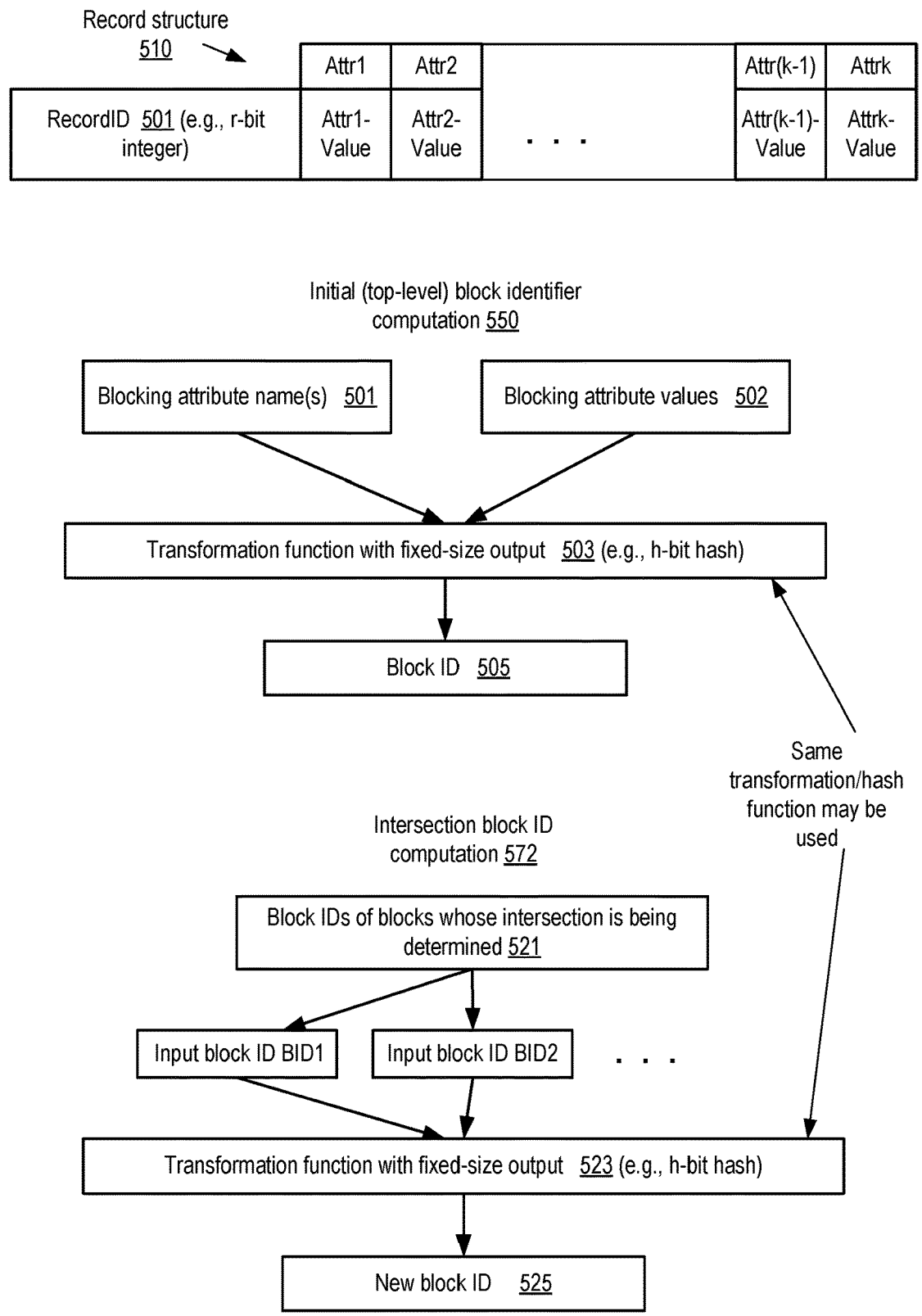
FIG. 5 illustrates an example use of transformation functions to generate block identifiers during various iterations of intersection-based dynamic blocking, according to at least some embodiments.

FIG. 5 illustrates an example use of transformation functions to generate block identifiers during various iterations of intersection-based dynamic blocking, according to at least some embodiments. In the depicted embodiment, individual data records are assumed to have the structure 510. Each record may, as shown, have a unique identifier 501 (which may be generated at a redundancy elimination service in some embodiments, e.g., during the cleaning stage discussed above) and respective values (some of which may be empty or null) for a plurality of attributes named Attr1, Attr2, . . . , Attrk. The length (in bits) of the record identifier may be selected as a parameter of the redundancy analysis system or service in some embodiments—e.g., an r-bit integer such as a 256-bit or a 128-bit integer may be used in some embodiments. In some embodiments, as mentioned earlier, the net result of using the intersection-based blocking algorithm may comprise adding (logically and/or physically depending on the implementation), to a given record, the value of an additional attribute representing the block identifier of an acceptable-size block to which that record has been assigned by the algorithm.

Each record block created, at the initial or top-level blocking stage and during later iterations, may be assigned a unique identifier of the same length as all the other blocks in some embodiments. In the initial computation 550 of block identifiers, one or more blocking attribute names 501 (e.g., names selected from the set {Attr1, Attrk}) and corresponding attribute values 502 (e.g., values selected from the corresponding elements of the set {Attr1-Value, . . . , Attrk-Value} may be provided as input to a transformation function 503 with a fixed-size output in the depicted embodiment. The output of the transformation function 503 (e.g., an h-bit hash value in the case where the transformation function is a hash function) may be used as the block identifier 505 in such an embodiment.

In each block size reduction iteration in which new blocks are constructed from the intersection of n-way combinations of oversized blocks as indicated earlier, block identifiers of the new blocks may be generated using a similar computation 572 in the depicted embodiment. The block identifiers or blocking keys 521 of the input oversized blocks whose intersection is being determined, BID1, BID2, . . . , may be provided as input to a transformation function 523 (such as a hash function) with a fixed-size output in some embodiments, and the output of the transformation function may be used as the identifier 525 of the new block. In various embodiments, the same transformation function may be used at the initial attribute-value based blocking stage and during the block size reduction iterations. In at least one embodiment, a different transformation function (with a different output size or the same output size) may be used. In at least one embodiment, as mentioned earlier, attribute names and/or values may be used for generating not just the top-level blocks, but also for other iterations of blocking (e.g., in combination with intersection). Thus, for example, in one such embodiment, the input to the transformation function 523 may include an attribute name and value, in addition to or instead of just the block identifiers 521. In some embodiments, other approaches which do not involve the use of transformation functions may be employed to generate block identifiers.

Methods for Intersection-Based Dynamic Blocking

Figure 6:
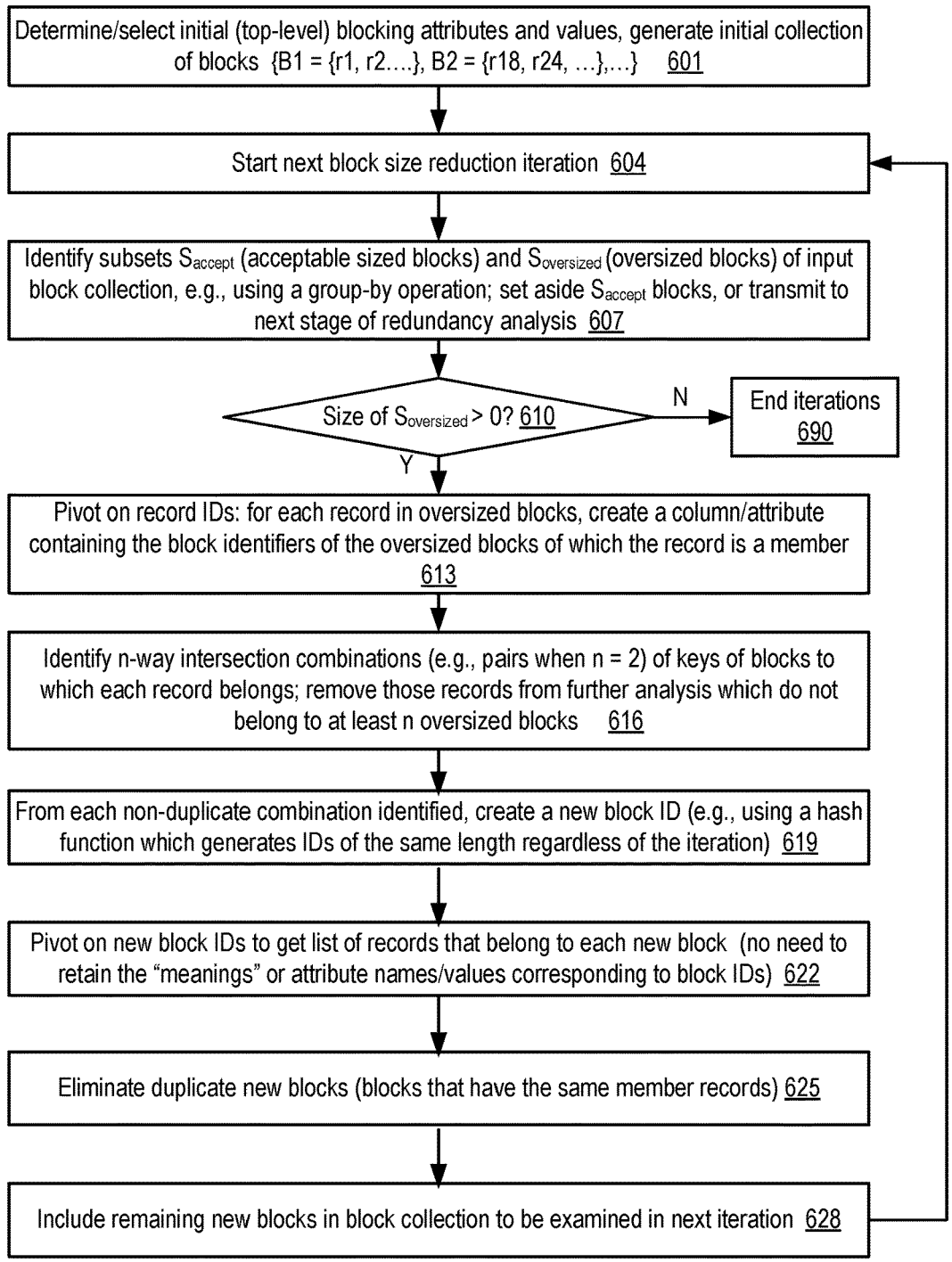
FIG. 6 is a flow diagram illustrating details of operations which may be performed to implement intersection-based dynamic blocking, according to at least some embodiments.

FIG. 6 is a flow diagram illustrating details of operations which may be performed to implement intersection-based dynamic blocking, according to at least some embodiments. To initiate the process, as indicated in element 601, a number of blocking-related parameters may be determined in the depicted embodiment, including for example a set of initial blocking attributes (such as "first name", "age", "gender") and corresponding values (such as "John", "George" etc. for the first name attribute), and the initial or top-level collection of blocks may be determined based on the attribute-value combinations. In some embodiments the task of identifying the top-level attributes and values may be automated—e.g., during an initial analysis of the records, some subset of the attributes may be selected as top-level blocking attributes. In other embodiments, clients of a blocking service may specify at least some of the top-level blocking attributes and/or values. The top-level blocks such as B1 (comprising records {r1, r2, . . . }), B2 (comprising records {r18, r24, . . . }) may be considered the input block collection for the first iteration of block size reduction. In addition to the top-level attribute information, values of other parameters may also be determined in various embodiments in operations corresponding to element 601, such as the threshold block population to be used to distinguish oversized blocks from acceptable blocks, the transformation/hash functions to be used to generate block identifiers, and so on. Note that it is possible that all the top-level blocks of a given input record collection are of an acceptable size in various embodiments, in which case block size reduction iterations may not be required.

The next block size reduction iteration may be started (element 604). From the input block collection of the iteration, subsets $S_{accept}$ and $S_{oversized}$ may be identified in the depicted embodiment (element 607). $S_{accept}$ may comprise the blocks of acceptable size (less than or equal to the threshold), while $S_{oversized}$ (greater than the threshold). (Depending on how the threshold is interpreted, in some embodiments only those blocks whose populations are strictly less than the threshold may be identified as acceptable, instead of including blocks whose population is less than or equal to the threshold.) In some embodiments, aggregation operations similar to group-by operations based on the block sizes may be used to identify the members of the two subsets. If the $S_{accept}$ subset is not empty, its blocks may be set aside as no further reductions in size are required for them in the depicted embodiment, and/or they may be transmitted to the next stage of redundancy analysis (such as pairwise matching/linkage).

If the size of $S_{oversized}$ is greater than zero (i.e., if any oversized blocks are present in the input collection of the iteration), as detected in operations corresponding to element 610, operations to identify non-empty intersections of combinations of the oversized blocks may be initiated in the depicted embodiment. If no oversized blocks are in the input block collection the block size reduction iterations may be terminated (element 690).

In some embodiments, as part of a pivot operation, for each record in an oversized block, a column or attribute containing the block identifiers of the blocks of which the record is a member may be created and populated (element 613). In one embodiment, in such a pivot operation, first a column containing a block identifier of a single oversized block to which a record belongs may be created (so that, if a given block belongs to K oversized blocks, K rows are created, with membership in a single oversized block indicated in each of the rows), and then an aggregation operation may be performed to obtain a column containing all the oversized block to which the record belongs. In effect, starting with a given group of block-to-record mappings for oversized blocks, a corresponding group of record-to-block-list mappings may be generated in some embodiments.

Next, in the depicted embodiment, with respect to each record, n-way combinations (such as pairs when n=2, 4-tuples when n=4, and so on) of oversized blocks to which the record belongs may be identified (element 616). The block count of the combinations (e.g., whether pairs of blocks are identified, or triplets of blocks are identified, etc.) may vary in different embodiments. In at least one embodiment, the combination block counts may be specified or selected as input parameters of the intersection-based blocking algorithm. In some embodiments, multiple block counts may be used. In various embodiments, if a given record does not belong to each block of at least one of the combinations, such a record may be removed from further analysis during the block size reduction iterations. In some embodiments, if one combination generated in operations corresponding to element 616 is found to be a duplicate of another or is contained within another, one of the two combinations may be eliminated from the set of combinations retained for further analysis.

A new block identifier may be generated corresponding to each non-duplicate block combination in the depicted embodiment (element 619), e.g., using a transformation function. In some embodiments one or more hash functions may be used which, given an input comprising the block IDs of the blocks included in a combination, generate an output block ID of the same length regardless of the iteration.

A pivot operation on the new block IDs may be performed (element 622) to obtain a list of records (represented by respective record identifiers) that belong to each new block in the depicted embodiment. Note that the semantics or "meanings" associated with the block IDs (such as whether the new block represents the set of records with ("first name=John" and "age=30") versus ("first name=Joseph" and "age=45")) need not be retained in at least some embodiments, resulting in smaller memory requirements than if the meanings of the block IDs were retained as in some other algorithms. In effect, in some embodiments, the pivot operations performed in a given iteration may comprise identifying groups of record identifiers of the records which belong to each oversized block, and then identifying, corresponding to respective ones of the records represented in a given oversized block, a group of block identifiers of the blocks to which the records belong. From the groups of block identifiers, combinations of a selected count of block identifiers at a time may then be generated in such embodiments, and the records which belong to each block of a given combination may be identified.

In various embodiments, duplicate new blocks (blocks that have the same member records), if any, may be eliminated (element 625), and the remaining non-duplicate new blocks may be included in the collection to be examined in the next block size reduction iteration (element 628). Operations corresponding to elements 604 onwards may then be implemented for the next iteration in the depicted embodiment.

It is noted that in various embodiments, some of the operations shown in FIG. 4 and/or in FIG. 6 may be implemented in a different order than that shown in the figure, or may be performed in parallel rather than sequentially. For example, in one embodiment, a given block size reduction iteration may be considered to begin after the acceptable-size blocks have been set aside from the new blocks generated in the previous iteration, which would result in rearrangement of some of the elements of FIG. 6. Additionally, some of the operations shown in FIG. 4 and/or FIG. 6 may not be required in one or more implementations.

Simple Example of Intersection-Based Dynamic Blocking

Figure 7:
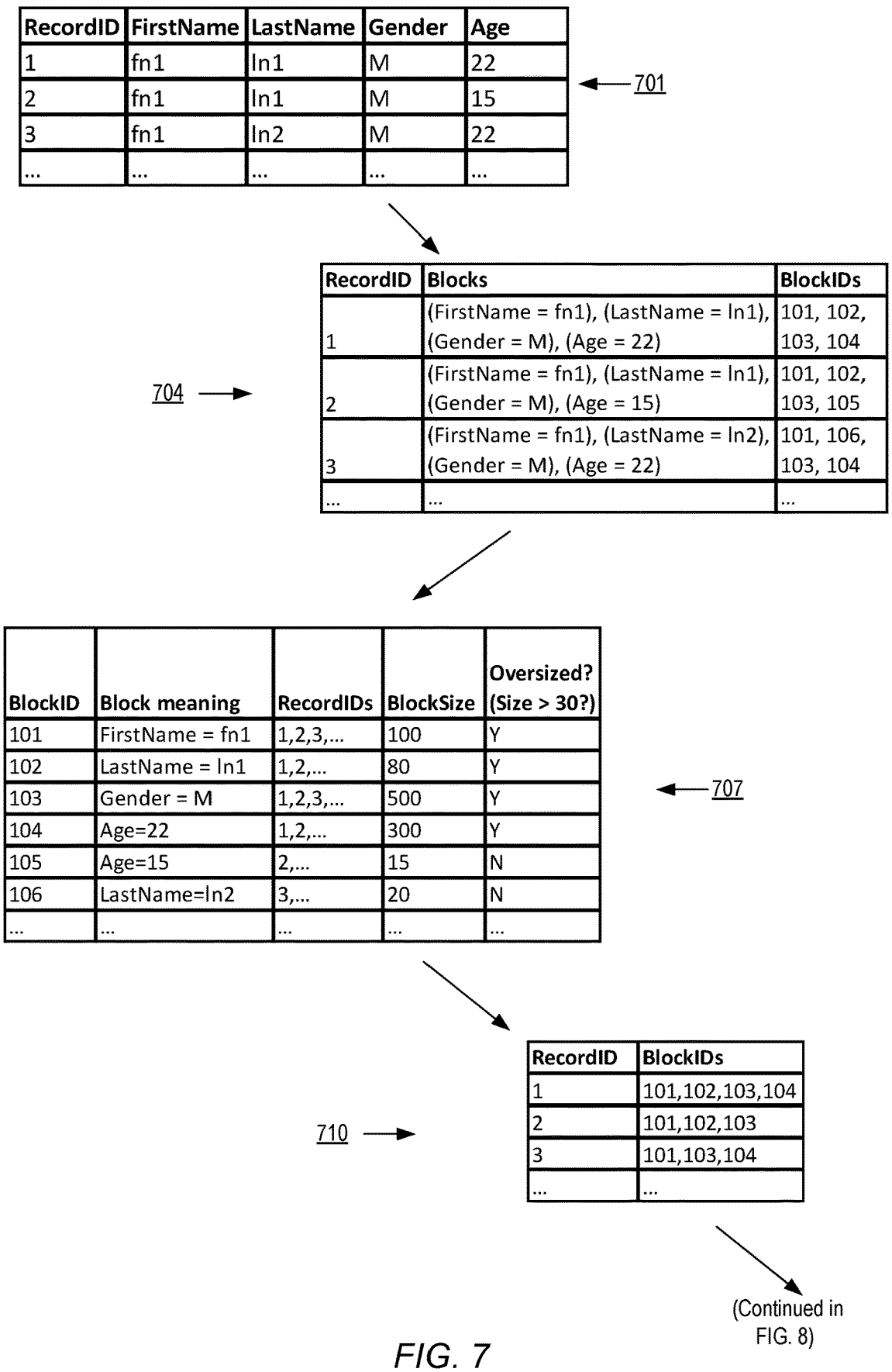
Figure 9:
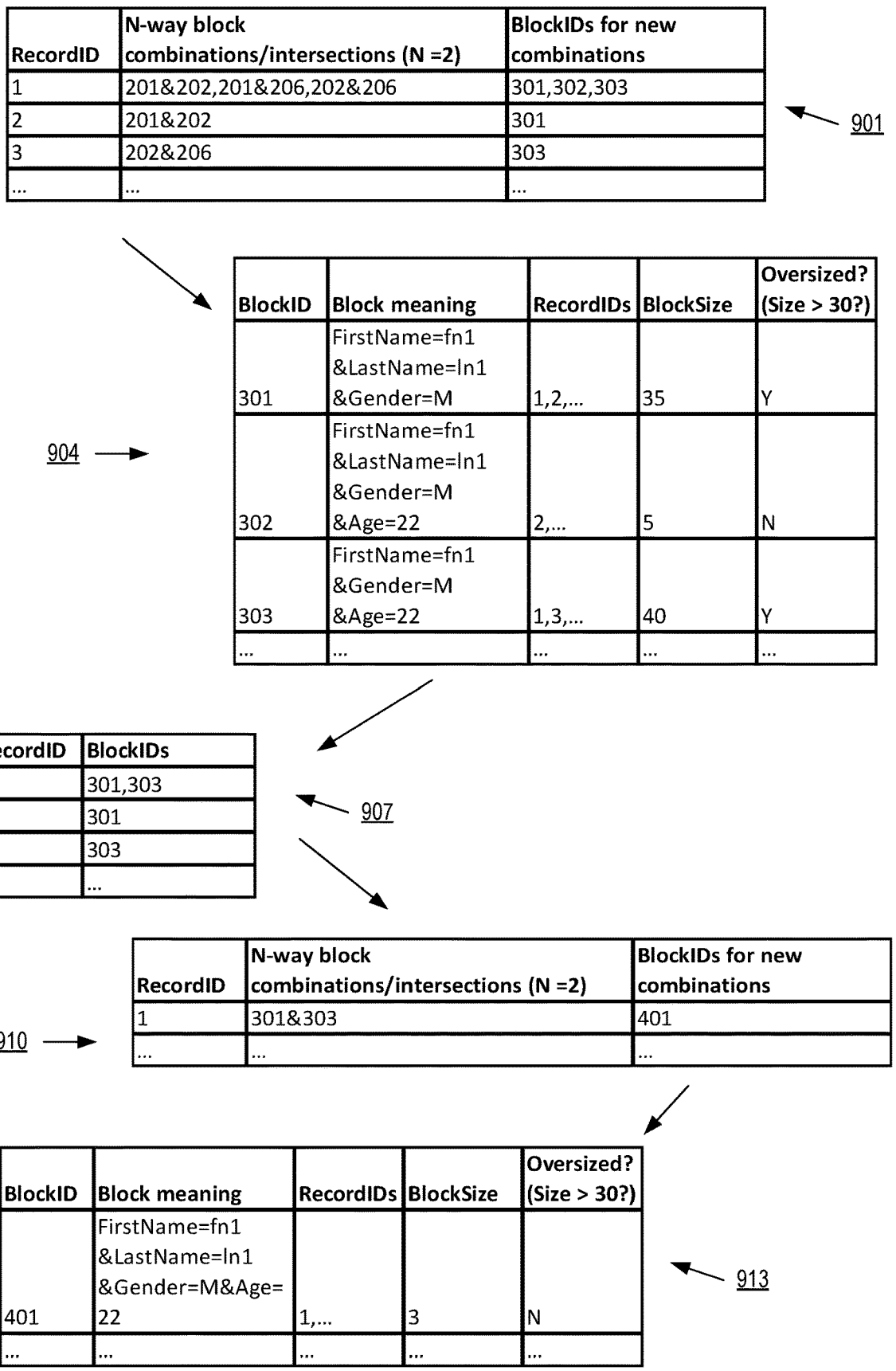

FIG. 7, FIG. 8, and FIG. 9 collectively illustrate a simple example of operations that may be performed during various stages of intersection-based dynamic blocking, according to at least some embodiments. Note that, in order to illustrate the concepts involved, without introducing excessive details, a trivial example with only a few record attributes and a small number of records is presented; in practice, records with far larger dimensionality and much more complex data sets may be analyzed in various embodiments.

In the depicted example, as indicated in element 701, each record refers to an individual and has an integer record identifier (recordID) such as 1, 2, 3, and so on. The attributes or record fields used to generate top-level attributes include a string FirstName attribute, a string LastName attribute, a Gender attribute (with values assumed to be either "M" for male or "F" for female), and an integer Age attribute. Thus, for example, in the record with recordID 3, the FirstName is "fn1", the LastName is "ln2", the gender is "M" and the age is 22. The goal of the blocking being performed in the depicted embodiment is to reduce the number of proposed "similar" record pairs to be analyzed using a detailed pairwise matching/similarity algorithm. Without block size reduction iterations of the kind illustrated, if there are N input records, N(N−1)/2 pairs would be generated, for which pairwise analysis may be intractable for large N; with block size reduction iterations, pairs may only have to be matched for records which fall within the same block, which may lead to significant improvements in performance. The input to the blocking service or system may comprise the set of records, the columns/attributes of the records to be used for blocking, and the threshold maximum number of records which would make a given output block acceptable. This threshold is assumed to be 30 in the depicted example. In the initial or top-level blocking, a single attribute is used to group the records in the depicted embodiment. Thus, for example, one group would correspond to "FirstName=fn1", another to "Age=22", and so on.

In element 704, corresponding to each record, the set of block identifiers of the top-level blocks to which the record belongs may be identified in the depicted embodiment. Thus, blockID 101 corresponds to "Firstname=fn1", blockID 102 corresponds to "LastName=ln1", blockID 103 corresponds to "Gender=M", blockID 104 corresponds to "Age=22", blockID 105 corresponds to "Age=15", and blockID 106 corresponds to "LastName=ln2". In at least some embodiments, a transformation function such as a hash function may be applied to the (attribute, value) combinations to obtain the blockIDs as discussed earlier. Although relatively small integer values are shown for the blockIDs and the recordIDs in the depicted example, in at least some implementations much larger values (e.g., a 64-bit long integer for the recordIDs and a 256-bit value for the blockIDs) may be used.

An inverse pivot on the block identifiers shown in element 704 may be performed in the depicted embodiment, with results shown in element 707, indicating the set of recordIDs which belong to each block, the block size (count of records in each block) and whether the block is oversized or not. The "meaning" of the blocks (the attribute names and values associated with the blocks), while shown in FIG. 7-FIG. 9, may not be retained in practice in at least some embodiments. Block 101 (i.e., the block with blockID 101) is assumed to contain 100 records; since the threshold is 30 records, block 101 is designated as oversized. Similarly, blocks 102, 103 and 104 are also oversized, while blocks 105 and 106 are acceptable-sized. Acceptable blocks may be set aside in the depicted embodiment. In another inverse pivot operation, this time on recordIDs, the list of blockIDs of the oversized blocks to which each record belongs may be identified, as shown in element 710. The further processing of the oversized blocks (101, 102, 103, and 104) remaining at this stage is illustrated in FIG. 8 and FIG. 9.

As shown in element 801 of FIG. 8, 2-way combinations of the oversized blocks to which a given record belongs may be identified in various embodiments, such as (102&102), (101&103), and (102&103) in the case of record 102. N-way combinations where N is greater than 2 may be identified in some embodiments. The exhaustive list of such n-way combinations may be identified in at least some embodiments; in other embodiments, the list identified may not necessarily be exhaustive. New blockIDs may be generated for each such combination, such as blockID 201 for the combination (101&102), blockID 202 for the combination (101&103), and so on, e.g., using transformation or hash functions as discussed above. Note that because pivot operations on record IDs are used to determine such combinations, the intersections of the blocks represented in each combination are non-empty in the depicted example—based on the way the combinations are generated, at least one record has to belong to any given combination that is generated.

An inverse pivot on the new blockIDs (201, 202, . . . ) may then be performed, resulting in the list of new blocks shown in element 804. By way of example, blocks 203, 204 and 205 are assumed to be acceptable in size, and are therefore set aside, while blocks 201, 202 and 206 are oversize and so have to be examined in the next iteration. In at least some embodiments, if a given newly-created block contains the same set of records as another one of the newly-created blocks, one of the two may be eliminated from further consideration in the depicted embodiment; in the present example, it is assumed that there are no duplicate blocks. At each stage where new block combinations are identified, in various embodiments duplicate combinations may also be eliminated from the as discussed earlier.

An inverse pivot on recordIDs may again be performed, resulting in the record-to-oversized-block-list mappings shown in element 807. In element 901 of FIG. 9, 2-way combinations of the oversized blocks are again constructed, and blockIDs for the newly-identified combinations (e.g., blockID 301 for the combination (201&202), etc.) may be identified. Another pivot operation on the new blockIDs may then be performed, resulting in the block-to-record-list mappings shown in element 904. Now, only two oversized blocks 301 and 303 remain. The results of the next pivot on recordIDs is shown in element 907.

Among the records discussed this far, only record 1 belongs to two different blocks 301 and 303 in the depicted example, as indicated in element 907. Records 2 and 3 each belong to a single oversized block (301 and 303 respectively). If the set of record attributes to be considered is limited to the four attributes illustrated (FirstName, LastName, Age and Gender), this means that no smaller intersection-based blocks can be identified for records 2 and 3. In at least some embodiments, such records, which do not belong to at least one n-way combination, may also be eliminated from further consideration (i.e., they may be excluded from the output block combinations of the iteration). In one embodiment, such records may be tagged and processed using a different analysis technique—e.g., more attributes/fields of such records, which are not part of the group of attributes being used for the current intersection-based iterations, may be examined in a separate pass of the analysis.

A new block identifier 401 may be generated for the remaining 2-way combination (301&303), as indicated in element 910. The size of block 401 may be determined after a pivot on blockIDs; in the depicted example the population is 3, as shown on element 913, which makes the block acceptable. The block size reduction iterations may then be concluded, as no oversized blocks remain in the depicted example. Note that duplicated blocks and duplicated block combinations may be removed at each iteration, although examples of such duplicates are not shown in FIG. 7-FIG. 9. Note also that at least in some embodiments, a given record may be present in more than one of the acceptable blocks identified, that is, a limit may not necessarily be enforced regarding the number of acceptable blocks to which a given record belongs. This feature may be helpful in at least some embodiments, because pairs of records within acceptable blocks may be matched on the basis of different combinations of attributes/fields in subsequent phases of redundancy analysis, and restricting the number of blocks to which a record can belong may potentially reduce the effectiveness of the pairwise similarity analysis. In various embodiments, compared to some alternative blocking algorithms such as a tree-based algorithm discussed earlier, the intersection-based technique may generates more block combinations in at least some iterations, and may require fewer iterations (and potentially fewer overall computation resources or time) to reach the goal of identifying acceptable blocks for the records being analyzed.

Distributed Intersection-Based Blocking

Figure 10:
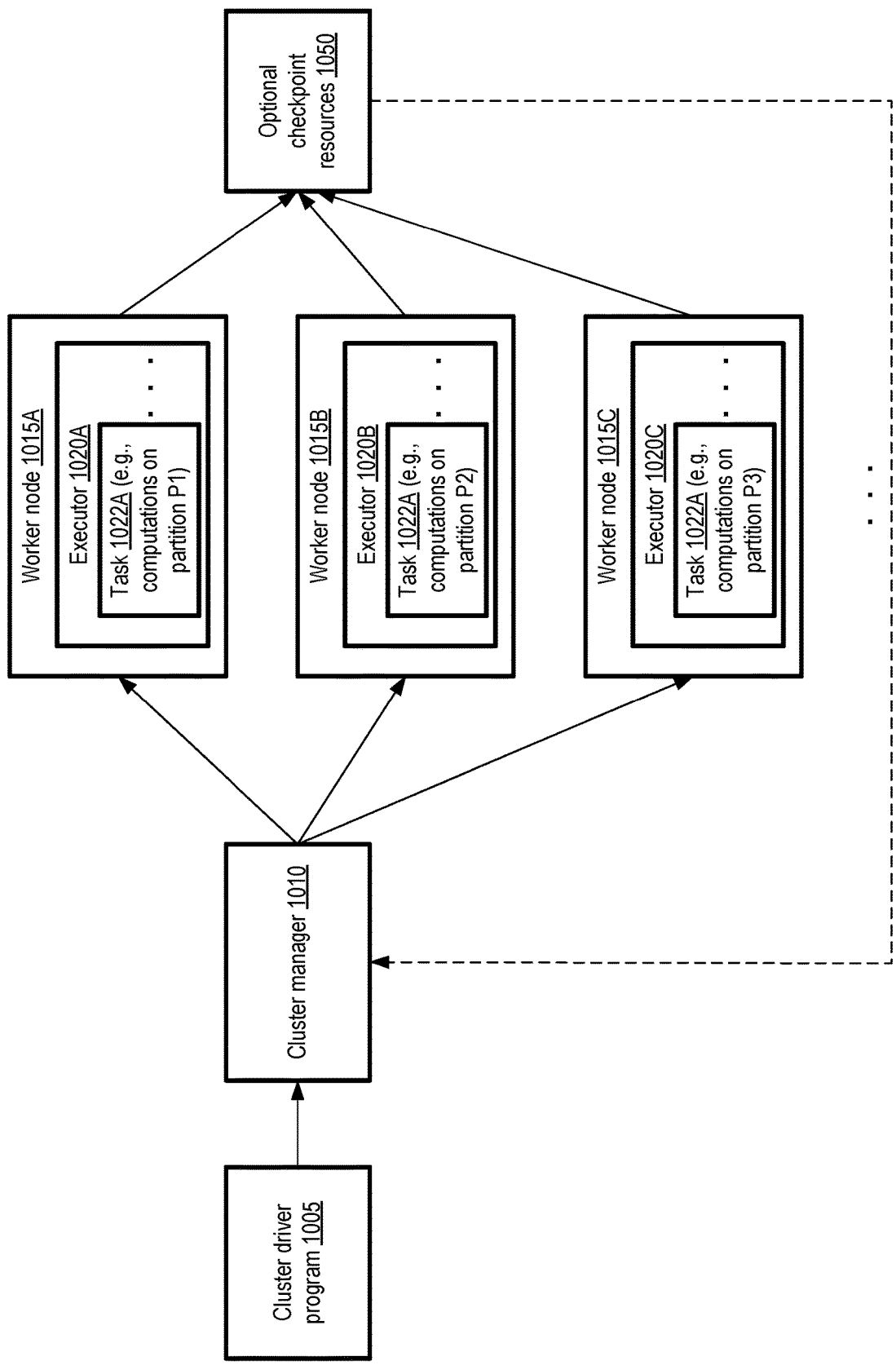
FIG. 10 illustrates an example distributed computing environment which may be employed for intersection-based dynamic blocking, according to at least some embodiments.

The intersection-based blocking techniques discussed above may be suitable for parallelization in various embodiments. FIG. 10 illustrates an example distributed computing environment which may be employed for intersection-based dynamic blocking, according to at least some embodiments. As shown, the environment may comprise a cluster driver program 1005 (the logical equivalent of a main program or a blocking coordinator), a cluster manager 1010, a set of worker nodes 1015 (such as 1015A, 1015B, and 1015C) and one or more optional checkpointing resources 1050 in the depicted embodiment. The cluster manager 1010 may be responsible for defining partitions of the data to be analyzed during a given block size reduction iteration, such that individual worker nodes 1015 are assigned one or more of the partitions. After the work of a given set of worker nodes is completed, the output produced may be "shuffled" in some embodiments, e.g., new partitions may be defined for further processing and transmitted to the appropriate nodes. In some embodiments, a plurality of worker nodes 1015 may be identified for a given block size reduction iteration, and the input block collection of the iteration may be divided into respective partitions corresponding to each of the worker nodes. The partitions may then be transmitted (e.g., directly from the worker nodes which were being used for a previous iteration) to the identified nodes for processing. In at least one such embodiment, depending on the size of the data, at least some of the transmissions may comprise main-memory-to-main-memory transfers, e.g., without requiring the use of persistent storage devices.

Depending on the phase of the analysis to be performed next (e.g., whether recordID-based pivots and/or group-by operations are to be performed, or blockID-based pivots and group-by operations are to be performed next), partitions may be defined, for example, in terms of block identifiers and/or record identifiers in various embodiments. In one embodiment, for example, top-level blocks T1 and T2 may be assigned to worker node 1015A, T3 and T4 to worker node 1015B, and so on, and tasks 1022 (e.g., 1022A-1022C) such as recordID-based pivots and/or group-by operations may be performed at the worker nodes. In some embodiments, a number of records R1 may be assigned to a given worker node 1015 where tasks 1022 to identify block combinations for those records may be performed, records R2 may be assigned to another worker node 1015 where additional tasks 1022 to identify block combinations may be performed, and so on. In at least some embodiments, because of the use of relatively small recordIDs and block-IDs, because only a fraction of the total number of record attributes may be considered for intersection, and because the meanings (attribute-value combinations) of the blocks may not be retained, computations of the intersection-based blocking algorithm may be performed largely or entirely within the main memories of the worker nodes as suggested above. In one embodiment, intermediate results (such as the output blocks generated after a given block size reduction iteration) may be saved at persistent checkpointing resources 1050 (e.g., one or more disk-based storage devices) from time to time during the intersection-based blocking algorithm. In other embodiments, checkpointing of intermediate results to persistent storage may not be performed. In some embodiments, distributed computing environments with architectures that differ from that depicted in FIG. 10 may be employed—e.g., a peer-to-peer network of computation nodes may be employed in one embodiment, instead of cluster managers and worker nodes.

Provider Network Environment

Figure 11:
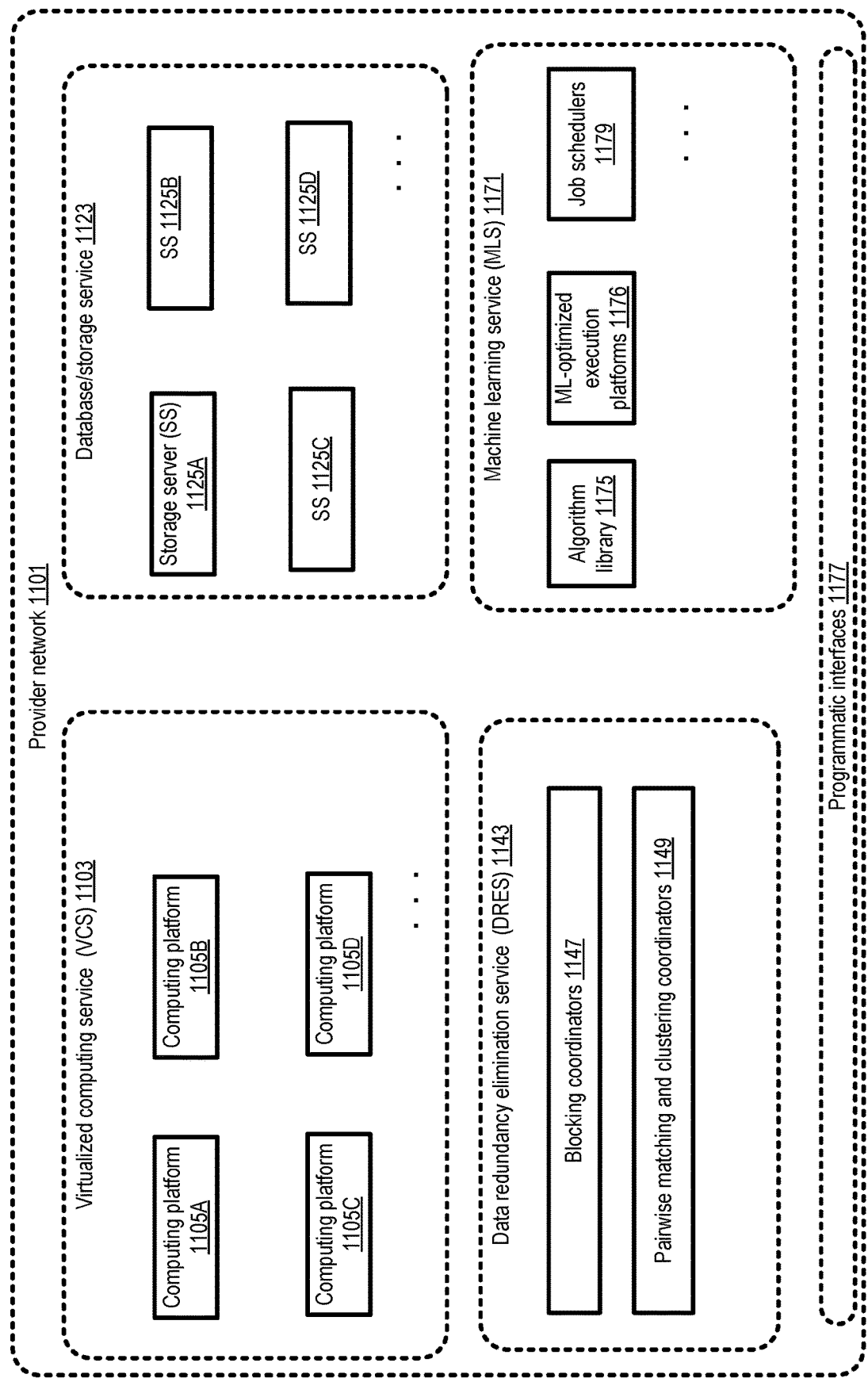
FIG. 11 illustrates an example provider network environment at which a data redundancy elimination service may be implemented, according to at least some embodiments.

In at least some embodiments, intersection-based dynamic blocking may be performed at a network-accessible service of a provider network. FIG. 11 illustrates an example provider network environment at which a data redundancy elimination service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1101 may comprise resources used to implement a plurality of services, including for example a virtual computing service 1103, a database or storage service 1123, a machine learning service 1171 and a data redundancy elimination service 1143. Components of a given service may utilize components of other services in the depicted embodiment—e.g., for some machine learning tasks, a component of the machine learning service 1171 may utilize virtual machines implemented at computing platforms such as 1105A-1105D of the virtualized computing service. Input data, intermediate results, final results and/or other artifacts of various machine learning algorithms or models may be stored at storage servers 1125 (e.g., 1125A-1125D) of the database or storage service 1123 in some embodiments. Individual ones of the services shown in FIG. 11 may implement a respective set of programmatic interfaces 1177 which can be used by external and/or internal clients (where the internal clients may comprise components of other services) in the depicted embodiment.

As shown, the data redundancy elimination service 1143 may comprise, among other components, one or more blocking coordinators 1147 (which may orchestrate the implementation of intersection-based and/or other blocking algorithms) as well as one or more pairwise matching and clustering coordinators 1149 in the depicted embodiment. The blocking coordinators 1147 and/or the pairwise matching and clustering coordinators 1149 may, for example, invoke algorithms selected from the machine learning algorithm library 1175 in some embodiments. In one embodiment, requests to train machine learning models such as models used for pairwise matching of records of blocks generated with the help of the blocking coordinators may be handled as batch jobs at the machine learning service, and a batch job scheduler 1179 may orchestrate the allocation of resources for the jobs as well as dependencies among jobs. In at least one embodiment, a machine learning service 1171 may have access to or include a set of execution platforms 1176 that are optimized for machine learning tasks (e.g., platforms that have customized hardware such as GPU arrays and/or customized software stacks). Depending on the suitability of such platforms for blocking and other redundancy analysis operations, execution platforms 1176 may be employed on behalf of the DRES 1143 in the depicted embodiment.

In at least some embodiments, the input and/or intermediate data sets of various blocking algorithms implemented by the DRES 1143 may be stored at one or more storage servers 1125 (e.g., 1125A-1125D) of the a storage service 1123. In one embodiment, the blocking algorithm operations may be implemented using non-specialized computing platforms of the virtualized computing service. In some embodiments, clusters of computing platforms of the VCS 1103 and/or other services of the provider network 1102 may be employed for intersection-based blocking.

In one embodiment, blocking algorithms including intersection-based blocking may be implemented without acquiring resources of network-accessible services such as those shown in FIG. 11. For example, a cluster implemented at one or more computing devices which are not part of a network-accessible service may be used in some embodiments.

Illustrative Computer System

Figure 12:
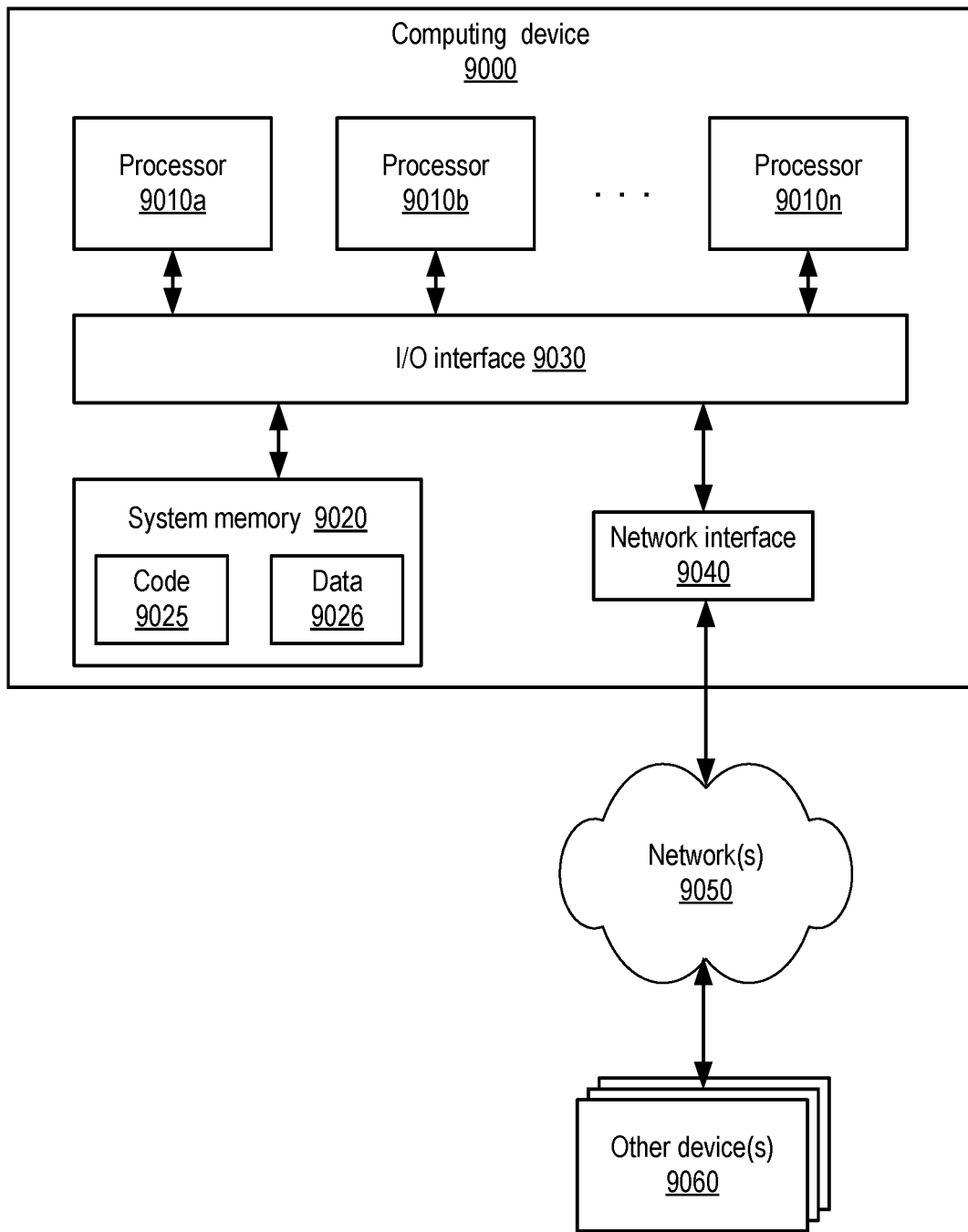
FIG. 12 is a block diagram illustrating an example computing device that may be used in at least some embodiments.

In at least some embodiments, a server that implements one or more of the techniques described above for intersection-based blocking and/or other stages of redundancy analysis may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, until a block size criterion is met, one or more block size reduction iterations on a plurality of blocks of records, wherein a block size reduction iteration comprises:
        identifying, from a first collection of blocks, using one or more pivot operations, a set of combinations of oversized blocks such that at least one record belongs to all blocks of a combination; and
        including, in a second collection of blocks to be examined in a subsequent block size reduction iteration, a new block comprising one or more records that are members of each block of a first combination of the set; and
    performing one or more analysis operations on at least one block created in the one or more block size reduction iterations.

2. The method as recited in claim 1, wherein the block size reduction iteration comprises:
    generating a block identifier for the new block, wherein the generating comprises applying a transformation function to one or more of the block identifiers of the blocks of the first combination.

3. The method as recited in claim 2, wherein the transformation function comprises a hash function.

4. The method as recited in claim 1, wherein a block identifier of a first block of the first collection is based at least in part on one or more of: (a) a name of an attribute of a first record included in the first block or (b) a value of an attribute of a first record included in the first block.

5. The method as recited in claim 1, wherein the one or more pivot operations comprise:
    identifying a first group of record identifiers of the records which belong to a first oversized block; and
    identifying, corresponding to an individual record represented in the first group, a group of block identifiers of the blocks to which the individual record belongs.

6. The method as recited in claim 5, further comprising:
generating, using members of the group of block identifiers, a first set of combinations of block identifiers, wherein individual ones of the combinations comprise at least a first count of block identifiers; and
identifying one or more records that belong to each block of a combination.

7. The method as recited in claim 1, wherein the block size reduction iteration comprises:
in response to detecting that each of the records in a first block of the second collection is present in a second block of the second collection, removing the second block from the second collection.

8. The method as recited in claim 1, wherein the block size reduction iteration comprises identifying, from the first collection, a first block of an acceptable size, wherein the first block comprises a first record and a second record, the method further comprising:
obtaining a similarity score of the first record with respect to the second record; and
in response to determining that the similarity score exceeds a threshold, generating an aggregated record based at least in part on the first and second records.

9. The method as recited in claim 1, further comprising:
dividing the second collection into a plurality of partitions, including a first partition and a second partition;
identifying a plurality of nodes of a distributed computing environment to be used for the subsequent iteration, including a first node and a second node;
transmitting, to the first node, the first partition; and
transmitting, to the second node, the second partition.

10. The method as recited in claim 9, wherein transmitting, to the first node, the first partition comprises a transfer of data from a main memory of a first device to a main memory of a second device, without saving the first partition to a persistent storage device.

11. A system, comprising:
a memory to store program instructions which, if performed by at least one processor, cause the at least one processor to implement a method to at least:
perform, until a block size criterion is met, one or more block size reduction iterations on a plurality of blocks of records, wherein a block size reduction iteration comprises:
identifying, from a first collection of blocks, using one or more pivot operations, a set of combinations of oversized blocks such that at least one record belongs to all blocks of a combination; and
including, in a second collection of blocks to be examined in a subsequent block size reduction iteration, a new block comprising one or more records that are members of each block of a first combination of the set; and
perform one or more analysis operations on at least one block created in the one or more block size reduction iterations.

12. The system as recited in claim 11, wherein the block size reduction iteration comprises:
generating a block identifier for the new block, wherein the generating comprises applying a transformation function to one or more of the block identifiers of the blocks of the first combination.

13. The system as recited in claim 11, wherein the one or more pivot operations comprise:
identifying a first group of record identifiers of the records which belong to a first oversized block; and
identifying, corresponding to an individual record in the first group, a group of block identifiers of the blocks to which the record belongs.

14. The system as recited in claim 13, wherein identifying the set of combinations of oversized blocks comprises:
generating, using members of the group of block identifiers, a first set of combinations of block identifiers, wherein individual ones of the combinations comprise at least a first count of block identifiers; and
identifying one or more records that belong to each block of a combination.

15. The system as recited in claim 11, wherein the program instructions, if performed by the at least one processor, cause the at least one processor to implement the method to:
receive an indication, via a programmatic interface, of one or more record attributes; and
generate, using the one or more record attributes as blocking keys, a first collection of blocks to be examined in a first block size reduction iteration.

16. A non-transitory computer-readable storage medium storing program instructions that when executed by one or more computing devices cause the one or more computing devices to implement:
performing, until a block size criterion is met, one or more block size reduction iterations on a plurality of blocks of records, wherein a block size reduction iteration comprises:
identifying, from a first collection of blocks, using one or more pivot operations, a set of combinations of oversized blocks such that at least one record belongs to all blocks of a combination; and
including, in a second collection of blocks to be examined in a subsequent block size reduction iteration, a new block comprising one or more records that are members of each block of a first combination of the set; and
performing one or more analysis operations on at least one block created in the one or more block size reduction iterations.

17. The non-transitory computer-readable storage medium as recited in claim 16, wherein the block size reduction iteration comprises:
generating a block identifier for the new block, wherein the generating comprises applying a transformation function to one or more of the block identifiers of the blocks of the first combination.

18. The non-transitory computer-readable storage medium as recited in claim 16, wherein the one or more pivot operations comprise:
identifying a first group of record identifiers of the records which belong to a first oversized block; and
identifying, corresponding to individual ones of the records in the first group, a group of block identifiers of the blocks to which the records belong.

19. The non-transitory computer-readable storage medium as recited in claim 18, wherein identifying the set of combinations of oversized blocks comprises:
generating, using members of the group of block identifiers, a first set of combinations of block identifiers, wherein individual ones of the combinations comprise at least a first count of block identifiers; and
identifying one or more records that belong to each block of a combination.

20. The non-transitory computer-readable storage medium as recited in claim 16, wherein the block size reduction iteration comprises:

identifying a first record which does not belong to at least one combination of the set; and excluding the first record from the second collection of blocks.

\* \* \* \* \*